Patented Jan. 19, 1926.

1,570,203

UNITED STATES PATENT OFFICE.

ARTHUR R. CADE, OF PITTSBURGH, PENNSYLVANIA, ASSIGNOR TO CARBIDE AND CARBON CHEMICALS CORPORATION, A CORPORATION OF NEW YORK.

PROCESS OF ETHYLATING AMINES.

No Drawing.    Application filed July 17, 1923. Serial No. 652,191.

*To all whom it may concern:*

Be it known that I, ARTHUR R. CADE, a citizen of the United States, residing at Pittsburgh, in the county of Allegheny and State of Pennsylvania, have invented certain new and useful Improvements in Processes of Ethylating Amines, of which the following is a specification.

The invention is a process of ethylating primary or secondary amines using an ethyl sulphate as ethylating agent.

The process is applicable to amines containing either alkyl or aryl groups or both, but will be described in connection with the ethylation of aniline with diethyl sulphate.

When aniline is treated with diethyl-sulphate under ethylating conditions, several different products are possible. Both mono- or diethyl aniline are usually found in the reaction product and their formation may be illustrated by the following equations:

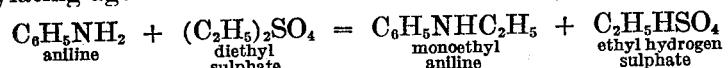

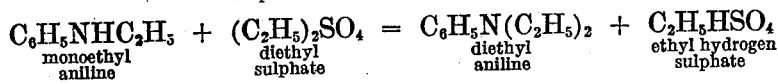

The ethyl hydrogen sulphate formed as above will combine with unchanged aniline and with both the ethyl anilines to form salts homologous with one or both the aniline sulphates $(C_6H_5NH_2)_2H_2SO_4$ and $C_6H_5NH_2H_2SO_4$.

This salt-forming reaction is not, properly speaking, an ethylation, and the ethyl groups which are consumed in the reaction are lost to the ethylation process. The possibility of decomposing the salts with a stronger base than the amine, thereby restoring to the ethylation process the ethyl groups combined in salt formation, accordingly suggests itself.

I have found that when sodium or potassium hydroxid is used for this purpose, the ethyl group liberated, instead of being made available for ethylation of the amine, is converted into ethyl alcohol, which is of course an undesired result. In accordance with my invention an alkaline-earth metal hydroxid or magnesium hydroxid is employed, calcium hydroxid being preferred.

To carry out the process, aniline, diethyl sulphate, and the hydroxid are mixed together (the order of mixing is immaterial) and heated under a reflux condenser, the heating being gradual to avoid too rapid a reaction. The temperature is eventually raised to about 145° C. and held at this point for about five hours. The reaction product may be distilled with steam, or water may be added and the mixture extracted with a suitable solvent immiscible with water.

The proportions of the reacting materials may be varied somewhat, depending on the product desired. To obtain a product free from unethylated aniline, the quantity of diethyl sulphate used is preferably in slight excess of that required to ethylate the aniline completely, while for the most complete utilization of the ethylating capacity of the diethyl sulphate, the hydroxid should be applied in quantity more than sufficient to combine with all the sulphate radicle present. For the result referred to, about 11 mols of diethyl sulphate and 12 mols of calcium hydroxid to 10 mols of aniline is the preferred proportion, though a larger excess of lime does no harm. With a sufficient quantity of lime and other proper conditions, a large proportion of both ethyl groups of the ethylating agents are utilized.

If a product containing unchanged aniline is wanted, a smaller proportion of diethyl sulphate may be used, while in a particular case where a mixture containing both the ethyl anilines in certain proportions but free from unused aniline was desired, the result was obtained by using a quantity of lime insufficient to combine with all the sulphate radicle present.

The better utilization of the ethyl groups when lime is used may be explained by the following equation:

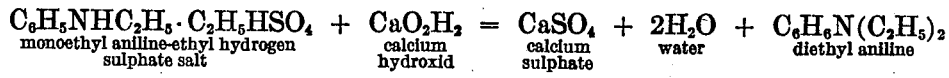

While calcium hydroxid commends itself because of its low price, the hydroxids of the other alkaline earth metals or of magnesium can also be used with good results.

I claim:

1. Process of ethylating amines which comprises treating the amine to be ethylated with an ethyl sulphate under ethylating conditions and in the presence of an alkaline compound of an alkaline-earth metal.

2. Process according to claim 1 in which the metal compound is present in quantity at least sufficient to fix all the sulphate radicle present.

3. Process according to claim 1 in which the amine to be ethylated is aniline.

4. Process according to claim 1 in which the alkaline-earth compound used is calcium hydroxid.

5. Process of ethylating aniline which comprises treating it under ethylating conditions with diethyl sulphate, in the presence of an alkaline compound of an alkaline-earth metal.

6. Process according to claim 5 in which the alkaline-earth compound used is calcium hydroxid.

In testimony whereof, I affix my signature.

ARTHUR R. CADE.